United States Patent [19]
Heiney

[11] 3,862,730
[45] Jan. 28, 1975

[54] FAS ACTUATION SYSTEM

[75] Inventor: Harold Gregory Heiney, Monroe, Conn.

[73] Assignee: United Aircraft Corporation, East Hartford, Conn.

[22] Filed: Oct. 23, 1973

[21] Appl. No.: 408,876

[52] U.S. Cl. ............... 244/83 D, 244/77 F, 244/78
[51] Int. Cl. ............................................. B64c 13/46
[58] Field of Search ...... 244/83 D, 83 R, 77 R, 77 A–77 V, 76 R, 76 A–76 C, 75 R, 17.11, 244/17.13, 78; 74/388; 91/434, 438, 91/363 R, 363 A, 370–374

[56] References Cited
UNITED STATES PATENTS

| | | | |
|---|---|---|---|
| 3,438,306 | 4/1969 | Kazmarek | 244/78 X |
| 3,450,375 | 6/1969 | Wilkerson | 244/77 F |
| 3,733,039 | 5/1973 | O'Connor et al. | 244/83 D X |

Primary Examiner—George E. A. Halvosa
Assistant Examiner—Paul E. Sauberer
Attorney, Agent, or Firm—Russell M. Lipes, Jr.

[57] ABSTRACT

A hydraulic feel augmentation system for high speed helicopters in which a force is applied to the cyclic stick in direct proportion to the loading induced by movement of the stick. An unbalance in electrical load sensing inputs to twin pressure control valves generates hydraulic flow to deactivate force pistons and a damping force is then provided for the cyclic stick. The stick can be activated by the pilot against the damping force, and the system will not be activated until reset.

7 Claims, 1 Drawing Figure

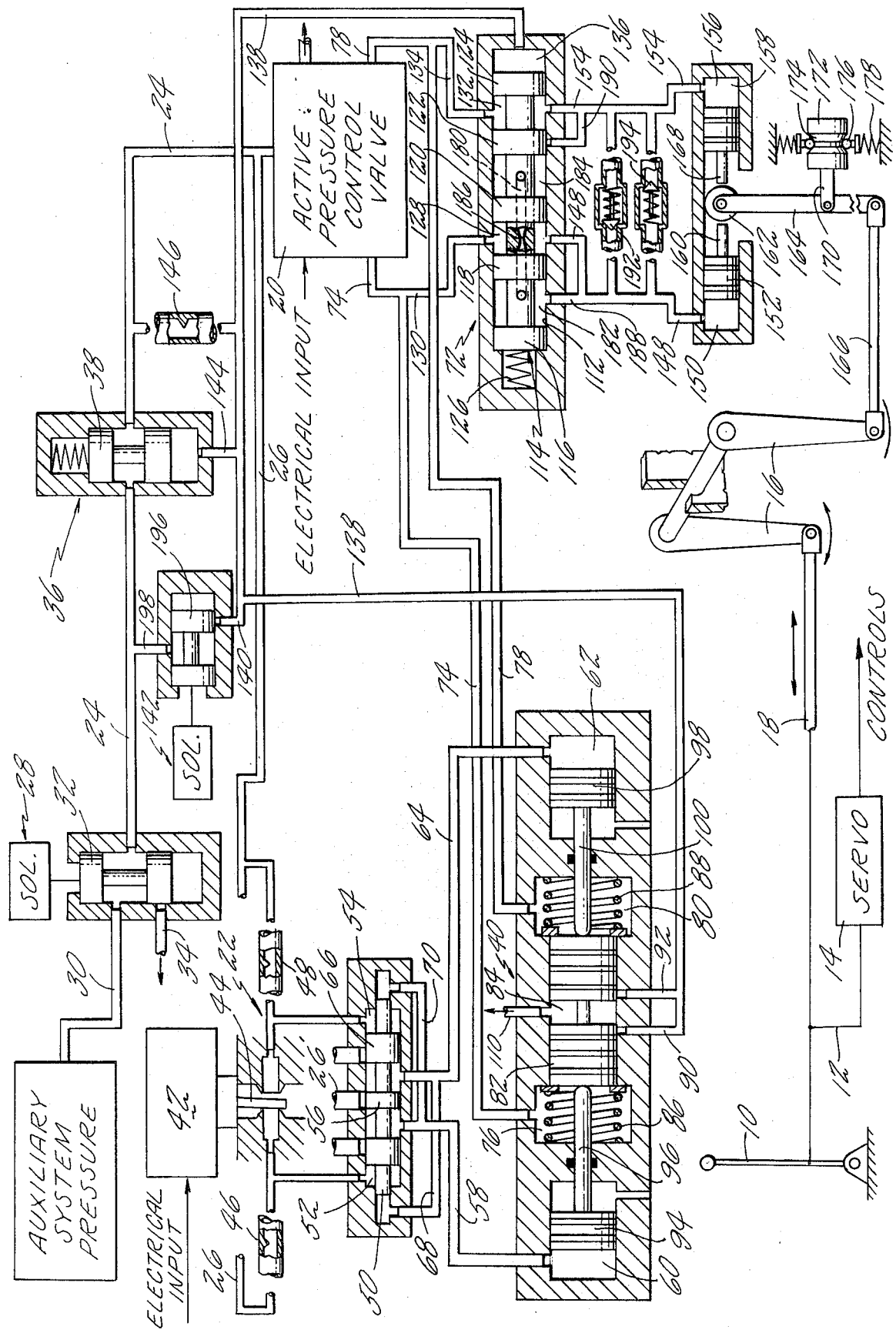

FAS ACTUATION SYSTEM

The invention herein described was made in the course of or under a contract or subcontract thereunder with the Department of the Army.

BACKGROUND OF THE INVENTION

1. Field of the Invention

This invention relates to improved controls for aircraft, and in particular to a feel augmentation system actuator for high speed helicopters. More specifically, this invention relates to a system which provides the pilot of a helicopter with a sensory input to enable him to correlate stick induced maneuvers of the helicopter to the helicopter's response.

Aircraft handling qualities are judged by the ease and precision with which a desired aircraft flight path can be achieved. To maneuver precisely, a pilot must be able to correlate his inputs with the aircraft's response. The pilot measures response by the load factor exerted on his body (the g-response). If stick inputs cannot be correlated with the resultant load factor, both in phase and in magnitude, precise maneuvering is difficult and handling qualities deteriorate. With the present generation of high speed helicopters, two problems inhibit the achievement of desirable handling qualities: first, there is an absence of stick forces that can be easily related to aircraft response; and second, the aerodynamic response to similar inputs increases rapidly with airspeed.

Currently, servo-boosted control systems do not yield a satisfactory input/response correlation, since no rotor head forces are felt on the input side of the servo. The pilot is left with only a displacement of the stick to compare with the load factor. Humans are not particularly adept at sensing small hand motions, so the correlation between stick input and aircraft reaction is minimal at best.

Present day automatic flight control systems employ mechanisms attached to the stick trim servos which exert breakout forces and spring forces on the pilot's hand. However, pilots often declutch the mechanisms and fly without any stick forces at all during maneuvers. The alternative risks pilot induced oscillations due to overcontrolling the aircraft after the breakout force has been overcome.

Changing sensitivity of the helicopter at different air speeds requires the pilot to adjust the size of his inputs to produce the same response. Currently, in the absence of stick force cues, pilots use vibrations due to blade stall as cues to adapt inputs to changing aerodynamics. If vibrations are eliminated by an advance in the art, a miscalculated input at high speeds could seriously overstress the aircraft before the pilot is aware that this has occurred.

A solution has been found to the sensitivity of the helicopter to stick motions at high speed which also provides the pilot with a direct sensory "feel" of the response of the helicopter to the pilot induced inputs through the cyclic stick.

2. Description of the Prior Art

Control feel augmentation for servo-boosted control systems has been employed in fixed wing aircraft since World War II. Generally, one of two techniques is employed. The first is to attach a bob-weight on the pitch control that reacts to any normal acceleration. The second technique is to increase the spring constant of the trim spring for the control stick with advancing airspeed. Both techniques are inadequate for high performance helicopters. The bob-weight system does provide a force gradient (pounds per load factor) that does not vary with airspeed. However, fixed wing aircraft do not enjoy the advantages of a direct lift lever, the collective stick. Helicopters need not change the fuselage attitude in order to climb. Thus load factors can be induced in a helicopter with no cyclic stick input. This advantage obviates the utility of cyclic bob-weights, which cannot discern between load factors induced by cyclic inputs from load factors induced by collective inputs. Use of bob-weights thus leads to undesirable collective-to-cyclic control coupling. This effect is particularly troublesome in high speed flight where the load factor response to collective input increases, and during the large attitude changes when transitioning to and from a hover. Moreover, bob-weights exert objectionable forces during maneuvers involving more than 90° of bank.

Currently, most servo-boosted helicopters use trim springs to center the cyclic stick in hands off flight. Changing the spring gradient (pounds per inch of deflection) of the trim spring as airspeed changes can compensate for the changes in pitch control sensitivity. However, collective stick inputs are not felt in the cyclic stick, and the spring forces felt by the pilot do not correlate well with the resultant load factor during maneuvers. For example, in the rolling reversal maneuver where from a right level turn the aircraft is rolled smoothly to a left level turn, the cyclic pitch stick must momentarily pass forward of its trim point to prevent the aircraft from gaining altitude as the aircraft rolls through wings level. With a stiff spring attached to the stick, an excessive pushing force must be exerted by the pilot, even though no negative load factor is induced. Similar instances of poor input/response correlation using Q-springs render this approach inadequate.

The present invention overcomes problems encountered in the prior art feel augmentation systems and provides a simplified novel and unique feel augmentation to enhance the high speed operation of helicopters.

In any control system, there is dependence upon input signals which serve as the base for operation. Failure or interruption of a signal must be taken into account. Systems for detecting signal failures and automatically actuating a system shut-down are known and two such systems are shown in U.S. Pat. Nos. 3,391,611 and 3,401,600. Further, a helicopter control system with which this invention can be used is disclosed in U.S. Pat. No. 3,719,336, assigned to applicant's assignee, to which reference is made for additional details about the control system.

SUMMARY OF THE INVENTION

The present invention provides a unique feel augmentation system for the helicopter cyclic stick for all airspeeds through the sensing of fuselage pitch rate and airspeed, providing an input to a feel actuating system which produces a force opposing the deflection applied to the cyclic stick by the pilot. By properly combining the signals, the feel augmentation system implements a constant ratio of stick force to mean load factor in the pitch axis. Load factors induced by collective inputs are not translated to cyclic stick forces. A similar control system may be provided in the roll axis to provide a constant ratio of stick force to aircraft roll rate.

In addition, the present invention provides duplication in the feel actuating system, and fault detectors that sense differences in portions of the duplicate systems are actuated to shutdown the feel augmentation system when discrepancies occur.

BRIEF DESCRIPTION OF THE DRAWING

The single FIGURE is a schematic drawing in partial block diagram form showing the main features of the present invention.

DESCRIPTION OF THE PREFERRED EMBODIMENT

The feel augmentation system described herein is applicable to any control element which produces an attitude or an altitude variation in a vehicle in response to movement of the control element. However, in describing a preferred embodiment it will be restricted to the cyclic stick of a helicopter, and specifically to attitude variations in the pitch channel of the helicopter caused by movement of the cyclic stick.

The feel augmentation system exerts forces on the cyclic stick that are related to the load factor caused by pitch inputs. The ratio of exerted forces to induced load factor is held constant as airspeed changes. Thus the pilot is provided with desirable handling qualities that do not change with airspeed. That is, if the pilot exerts a 15 lbs. pull on the stick, he will achieve a 1-g load factor regardless of his airspeed. While the stick deflection required to induce a 1-g load factor diminishes as airspeed increases, the stick force required does not change, and at 200 knots the pilot commands a given aircraft response with the same force input used at 100 knots.

The feel augmentation system is shown in the drawing. Cyclic control stick 10 is connected by link 12 through servo 14 to the rotor pitch control system of a helicopter. A feel augmentation system imposes a loading on stick 10 as will be explained through arms 16 and link 18 connected to link 12 and the cyclic stick. The arms 16 represent the transfer of loading motion from within the feel augmentation system casing to the external cyclic stick linkage.

The feel augmentation system utilizes duplicate systems responsive to helicopter inputs to generate duplicate electrical inputs. Sensors provide flight path measurements on which computations are performed. As a result of the inputs from the sensors and the computations performed thereon separate electrical signals are fed to active pressure control valve 20 and model pressure control valve 22. The active pressure control valve provides a differential pressure proportional to the electrical input. This pressure ultimately produces an output force proportional to the electrical signal which is imposed upon cyclic stick 10 as will be explained. The model pressure control valve is structurally the same as the active pressure control valve and it provides a reference differential pressure against which the output of the active pressure control valve is compared.

Hydraulic pressure is supplied to valves 20 and 22 through conduits 24 and 26. Solenoid activated turn-on valve 28 which switches the system on at a pilot's command controls the admission of pressure to the conduits. This turn-on valve is a two-position valve which in the position shown admits pressure to the system from source conduit 30 and in its other position, with spool 32 moved downward in the drawing, closes off the source and vents pressure in the feel augmentation system to return 34. Failure shutdown valve 36 is positioned in conduit 24 between turn-on valve 28 and pressure control valves 20 and 22 and shuts off supply pressure in the event of a malfunction in either of the electrical input systems or the pressure control valves. Spool 38 within shutdown valve 36 is spring-loaded in one direction to a position interrupting flow through conduits 24 and 26 and pressure loaded in the opposite direction to a position permitting flow.

Model pressure control valve 22 controls the pressures admitted to opposite ends of pressure comparator 40. The valve consists of torque motor 42 which receives the electrical input and which operates flapper valve 44 in conduit 26 between restrictions 46 and 48. Movement of valve spool 50 results from actuation of the flapper valve by the torque motor to change the relative pressures in chambers 52 and 54 adjacent opposite ends of the spool. When the spool moves to the right, pressure is admitted from conduit 26 past land 56 on the spool and through conduit 58 to chamber 60 at the left end of pressure comparator 40. At the same time pressure is bled from chamber 62 at the right end of pressure comparator 40 through conduit 64 past land 66 to return. The relative change in pressures in chambers 60 and 62 is reflected through connections 68 and 70 to opposite ends of spool 50 to null the spool. When the spool moves to the left in response to flapper valve action, the pressure in chamber 62 increases and the pressure in chamber 60 decreases until spool 50 is nulled.

Similarly, active pressure control valve 20 has a torque motor, flapper valve, and spool arrangement which provides differential pressures to pressure comparator 40 and engage/disengage valve 72 proportional to the electrical input to the active pressure control valve. Conduit 74 connects valve 20 to intermediate chamber 76 at the left side of pressure comparator 40, and conduit 78 connects valve 20 to intermediate chamber 80 at the right side of the comparator. The porting of the spool is the opposite of that for spool 50 in model pressure control valve so that movement of the spool to the right will admit pressure to comparator chamber 80 and decrease the pressure in chamber 76, and movement to the left will admit pressure to chamber 76 and decrease the pressure in chamber 80.

Pressure comparator 40 contains spool 82 having groove 84 about its midportion and is oppositely loaded by springs 86 and 88 in intermediate chambers 76 and 80, respectively. The springs tend to keep the spool in an equilibrium position, closing the ends of branch conduits 90 and 92. Chamber 60 contains piston 94 having rod 96 contacting the left face of spool 82, and chamber 62 contains piston 98 having rod 100 contacting the right face of spool 82. The two pistons and the spool have the same diameter. The construction is such that the pressures in chambers 60 and 76 acting on the left faces of piston 94 and spool 82, respectively, oppose the pressures in chambers 62 and 80 acting on the right faces of piston 98 and spool 82, respectively. When a malfunction occurs in the electrical input system to either the active or model pressure control valves or in one of the valves, an unbalance in the pressures sensed by comparator 40 will cause displacement of spool 82 and either conduit 90 or conduit 92 will be connected to return 110 for a purpose to be explained.

In addition to the transmittal of differential pressures from active pressure control valve 20 to comparator 40, these same pressures are provided to engage/disengage valve 72. This valve has bore 112 containing therein spool 114 having lands 116, 118, 120, 122 and 124 thereon. Spring 126 tends to move the spool to the right in the bore. Chamber 128 between lands 118 and 120 is connected by conduit 130 to active pressure control valve conduit 74, and chamber 132 between lands 122 and 124 is connected by conduit 134 to active pressure control valve conduit 78. Chamber 136 at the right end of spool 114 is connected by conduit 138 to branch conduits 90 and 92 in pressure comparator 40. Conduit 138 also is connected by branch conduit 140 to failure restart valve 142 to permit charging of conduit 138 after a shutdown of the system; by branch conduit 144 to failure shutdown valve 36 to afford pressure loading of piston 38; and through restriction 146 to supply conduit 24.

Chamber 128 in engage/disengage valve 72 is connected by conduit 148 to chamber 150 at the left of force piston 152, and chamber 132 in the engage/disengage valve is connected by conduit 154 to chamber 156 at the right of force piston 158. Rod 160 extending from the right side of force piston 152 contacts roller 162 on one end of lever 164, the other end of the lever being connected by link 166 to one of arms 16 in the cyclic stick linkage. Rod 168 extending from the left side of force piston 158 contacts roller 162 on the side opposite that contacted by rod 160. Lever 164 pivots about relatively fixed detent link 170 which has an enlarged portion 172 having annular groove 174 therein. One or more balls 176 loaded by spring 178 in the groove tends to hold the detent link in a fixed position. However, if force pistons 152 and 158 should jam for some reason and tend to lock cyclic stick 10, the pilot can override the jam by moving the linkage and forcing the balls out of the groove. Lever 164 then would pivot about roller 162 and the pilot would have complete control over the cyclic stick even though the feel augmentation system was inoperative.

Spool 114 in engage/disengage valve 72 has internal passage 180 providing connection between groove 182 defined between lands 116 and 118 and groove 184 defined between lands 120 and 122. The internal passage has damping restriction 186 therein. In its operational position, as shown, when there is pressure in chamber 136, spool 114 is displaced to the left and provides connection between conduits 130 and 148 to admit one active control valve pressure to force piston chamber 150 and between conduits 134 and 154 to admit the other active control valve pressure to force piston chamber 156. Conduit 148 is connected by branch conduit 188 to chamber 182 and the pressure in conduit 148 will be admitted to spool passage 180 and groove 184 where it is deadened. Conduit 154 is connected by branch conduit 190 to bore 112 where it is blocked by land 122. When the pressure in chamber 136 acting on the spool is reduced, spring 126 will displace the spool to the right. In this position of the spool, the damping position of feel augmentation operation, land 118 blocks connection between active pressure control valve 20 and the left side of the force pistons by cutting off conduit 148 from connection with conduit 130, and land 122 blocks connection between the active pressure control valve and the right side of the force pistons by cutting off conduit 154 from connection with conduit 134. However, communication is afforded between force piston chambers 150 and 156 by conduit 148, branch conduit 188, spool passage 180, restriction 186, branch conduit 190 and conduit 154. The force pistons then can move back and forth in a limited sense and the cyclic stick linkage is not rigidly bound. Load limiting valves 192 and 194 in conduits interconnecting conduits 148 and 154 limit the maximum differential pressure across the force pistons, valve 192 providing protection in one direction and valve 194 providing protection in the opposite direction.

OPERATION

When the pilot desires to activate the feel augmentation system either initially or after an apparent malfunction of the system, turn-on valve 28 is activated to raise spool 32 and afford connection between source conduit 30 and conduit 24. Since spool 38 in shutdown valve 36 is spring displaced, pressure in conduit 24 is blocked from pressure control valves 20 and 22. Failure restart valve 142 is momentarily actuated at the same time that the turn-on valve is actuated and spool 196 in the failure restart valve is displaced to afford connection between branch conduits 198 and 140, admitting pressure to conduit 138. This pressure will displace spool 38 in shutdown valve 36 to admit pressure to pressure control valves 20 and 22, and also displace spool 114 in engage/disengage valve 72 to permit connection between active pressure control valve 20 and force piston chambers 150 and 156. With the system thus charged, the pressure control valves will input differential pressure signals to pressure comparator 40. As long as these pressure outputs are balanced, force pistons 152 and 158 will be subject to a differential pressure loading in accordance with the electrical input to active pressure control valve 20, and cyclic stick 10 in turn will be subjected to a loading deflection.

In the event of a disagreement in the electrical input to either pressure control valve or a malfunction of either valve, the pressure balance across comparator 40 is upset and spool 82 is displaced either to the right or the left, venting one of the branch conduits 90 or 92 to return 110. This action will bleed the pressure in conduit 138 and chamber 136 which, by virtue of restriction 146, will result in shutdown valve 36 cutting off the pressure supply to pressure control valves 20 and 22 and in spool 114 in engage/disengage valve 72 cutting off the differential pressure signal from pressure control valve 20. Force pistons 152 and 158 are then in the damping mode of operation.

To restart the system after an unbalance across pressure comparator 40 has interrupted normal feel augmentation system operation, the pilot would operate failure restart valve 142 as has been described in order to repressurize conduit 138 and displace failure shutdown valve spool 38 and engage/disengage valve spool 114 to operational position. Of course if the malfunction persists, equilibrium cannot be maintained across the pressure comparator and conduit 138 will not hold pressure.

Although the invention has been shown and described with respect to a preferred embodiment thereof, it should be understood by those skilled in the art that changes and omissions in the form and detail thereof may be made without departing from the spirit and scope of the invention, which is to be limited and defined only as set forth in the following claims.

I claim:

1. In a feel augmentation system for the cyclic stick of a helicopter,
   a first pressure control valve,
   a second pressure control valve,
   means for supplying duplicate electrical signals indicative of helicopter load factors to said control valves,
   force means connected to said cyclic stick through which a force indicative of helicopter loading can oppose deflection of said cyclic stick,
   means connecting said first pressure control valve and said force means to provide a force proportional to the electrical input to said first pressure control valve,
   engage/disengage valve means in said connecting means between said first pressure control valve and said force means,
   pressure comparator means sensing pressure outputs of said first and second pressure control valves,
   means responsive to a pressure unbalance between said first and second pressure control valves for actuating said engage/disengage valve to isolate said force means from said first pressure control valve,
   means for providing a damping resistance opposing cyclic stick deflection upon a pressure unbalance and isolation of said force means, and
   load limiting means for the damping resistance.

2. Apparatus as in claim 1 and including means permitting cyclic stick deflection upon jamming of said force means.

3. For the control system of a helicopter, a feel augmentation system comprising:
   first pressure control valve means,
   second pressure control valve means,
   a common fluid supply to said first and second pressure control valve means,
   means for said first and second pressure control valve means to receive duplicate signals from separate electrical sources,
   means for each of said first and second pressure control valves to provide a differential fluid pressure proportional to said electrical signal,
   means connected to the helicopter control system,
   means for applying the differential fluid pressure provided by said first pressure control valve means to said helicopter control system connected means,
   engage/disengage valve means between said first pressure control valve means and said applying means,
   means in said engage/disengage valve means normally permitting fluid connection between said first pressure control valve means and said applying means,
   means subject to the differential fluid pressures provided by said first and second pressure control valve means for comparing said fluid pressures,
   means in said comparing means subject to disagreement between said first and second pressure control valve means differential fluid pressures above a certain limit to actuate said engage/disengage valve means and disconnect said fluid connection between said first pressure control valve means and said applying means,
   and means in said engage/disengage valve means providing fluid damping for said applying means upon disconnect of said fluid connection.

4. Apparatus as in claim 3 including shutdown valve means in said common fluid supply to cut off said fluid supply upon disconnecting actuation of said engage/disengage valve means.

5. Apparatus as in claim 1 including means to actuate said shutdown valve means and readmit supply fluid to said first and second pressure control valve means after disconnecting actuation of said engage/disengage valve means.

6. Apparatus as in claim 5 including means to also actuate said engage/disengage valve means to restore fluid connection between said first pressure control valve means and said applying means.

7. Apparatus as in claim 3 including means permitting control system actuation upon malfunction of said applying means.

* * * * *